(12) United States Patent
Svoen et al.

(10) Patent No.: US 9,578,398 B2
(45) Date of Patent: Feb. 21, 2017

(54) WIRELESS SENSOR DEVICE AND METHOD FOR WIRELESSLY COMMUNICATING A SENSED PHYSICAL PARAMETER

(75) Inventors: Geir Svoen, Oslo (NO); Tor Ole Bang-Steinsvik, Jar (NO); Kenneth Juul, Oslo (NO); Sverre Froystein, Kolsas (NO); Orjan Lag, Oslo (NO)

(73) Assignee: ABB AS, Billingstad (NO)

( * ) Notice: Subject to any disclaimer, the term of this patent is extended or adjusted under 35 U.S.C. 154(b) by 1006 days.

(21) Appl. No.: 13/530,688

(22) Filed: Jun. 22, 2012

(65) Prior Publication Data

US 2012/0319866 A1 Dec. 20, 2012

Related U.S. Application Data

(63) Continuation of application No. PCT/EP2009/067786, filed on Dec. 22, 2009.

(51) Int. Cl.
*G08C 19/04* (2006.01)
*H04Q 9/00* (2006.01)
*G01H 1/00* (2006.01)

(52) U.S. Cl.
CPC .................. *H04Q 9/00* (2013.01); *G01H 1/00* (2013.01); *H04Q 2209/25* (2013.01); *H04Q 2209/43* (2013.01); *H04Q 2209/883* (2013.01)

(58) Field of Classification Search
None
See application file for complete search history.

(56) References Cited

U.S. PATENT DOCUMENTS

| | | | | | |
|---|---|---|---|---|---|
| 3,581,266 | A | * | 5/1971 | Weyenberg | H01C 1/028 174/528 |
| 4,367,523 | A | * | 1/1983 | Urba | H01L 25/072 257/706 |
| 4,476,706 | A | * | 10/1984 | Hadden | G01N 33/007 73/1.07 |
| 4,515,516 | A | * | 5/1985 | Perrine | F04B 41/00 222/3 |
| 4,971,269 | A | * | 11/1990 | Koda | 244/171.7 |
| 5,046,149 | A | * | 9/1991 | Nunan | 307/10.1 |
| 5,552,592 | A | * | 9/1996 | Dvorkis | G06K 7/10554 235/454 |
| 5,828,564 | A | * | 10/1998 | Mori | H01L 25/115 257/722 |

(Continued)

OTHER PUBLICATIONS

Zheng Chen; "High Pulse Power System Through Engineering Battery-Capacitor Combination"; Energy Conversion Engineering Conference and Exhibit; 2000; vol. 2, Jul. 24, 2000; pp. 752-755.

(Continued)

*Primary Examiner* — Curtis King
(74) *Attorney, Agent, or Firm* — Whitmyer IP Group LLC

(57) ABSTRACT

A wireless vibration sensor suitable for connection to a distributed industrial control system arranged with a wireless network for communication of process data or control information. The wireless vibration sensor includes at least one sensor, a wireless radio transmitter, and a base part for mounting it firmly on equipment or a structure. The wireless sensor is arranged with a battery and a power storage device. A method for powering up the wireless sensor during active cycles is also described.

34 Claims, 4 Drawing Sheets

(56) References Cited

U.S. PATENT DOCUMENTS

| | | | |
|---|---|---|---|
| 6,153,932 A * | 11/2000 | Liang | H01L 23/3672 |
| | | | 257/712 |
| 6,737,580 B2 * | 5/2004 | Eaton et al. | 174/388 |
| 7,424,403 B2 * | 9/2008 | Robinson et al. | 702/189 |
| 8,190,331 B2 * | 5/2012 | Browne et al. | 701/45 |
| 2001/0028305 A1 | 10/2001 | Bennett, Jr. et al. | |
| 2001/0050531 A1 * | 12/2001 | Ikeda | B82Y 20/00 |
| | | | 313/498 |
| 2003/0093188 A1 * | 5/2003 | Morita et al. | 701/1 |
| 2004/0021216 A1 * | 2/2004 | Hosoya | H01L 23/13 |
| | | | 257/699 |
| 2004/0095251 A1 * | 5/2004 | Jackson | 340/686.6 |
| 2004/0133092 A1 * | 7/2004 | Kain | A61B 5/0031 |
| | | | 600/377 |
| 2007/0201711 A1 * | 8/2007 | Meyer et al. | 381/182 |
| 2008/0082296 A1 * | 4/2008 | Robinson et al. | 702/182 |
| 2009/0207770 A1 | 8/2009 | Fayfield et al. | |
| 2009/0310270 A1 | 12/2009 | Burns et al. | |
| 2010/0026518 A1 * | 2/2010 | Kirst | G01D 11/245 |
| | | | 340/870.05 |
| 2010/0082272 A1 * | 4/2010 | Lane et al. | 702/56 |
| 2011/0172847 A1 * | 7/2011 | Chen et al. | 700/298 |
| 2014/0000373 A1 * | 1/2014 | Soma' et al. | 73/658 |
| 2015/0015405 A1 * | 1/2015 | Bark et al. | 340/682 |

OTHER PUBLICATIONS

International Preliminary Report on Patentability; Application No. PCT/EP2009/067786; Issued: Dec. 28, 2011; 16 pages.
International Search Report & Written Opinion of the International Searching Authority; Application No. PCT/EP2009/067786; Issued: Sep. 7, 2010; Mailing Date: Sep. 28, 2010; 11 pages.

* cited by examiner

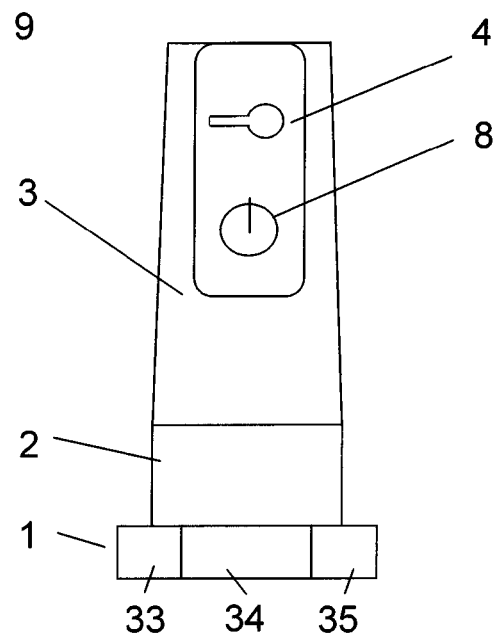
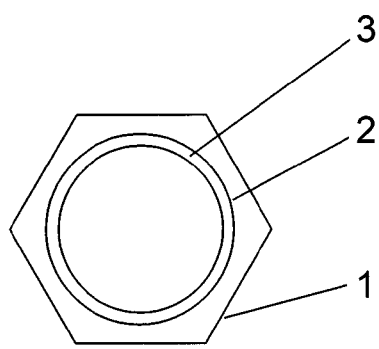
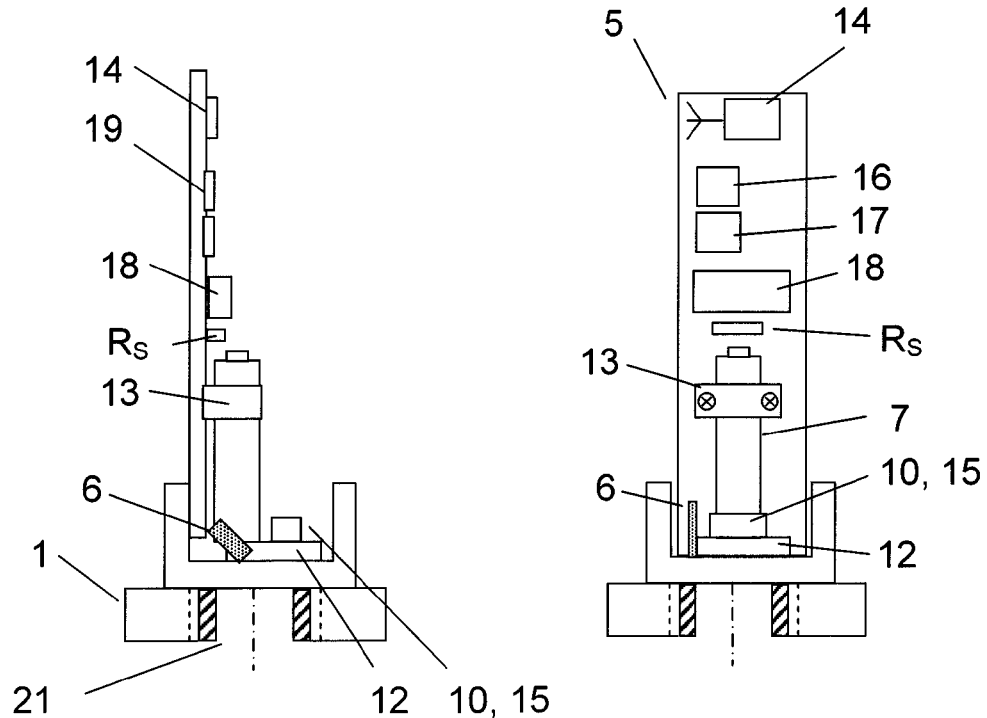
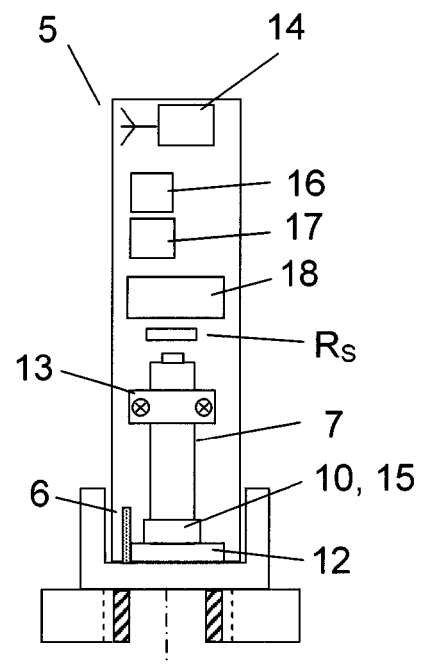
Fig 1a
Fig 1b
Fig 1c
Fig 1d

WIRELESS SENSOR DEVICE AND METHOD FOR WIRELESSLY COMMUNICATING A SENSED PHYSICAL PARAMETER

CROSS-REFERENCE TO RELATED APPLICATIONS

The present application is a continuation of pending International Patent Application PCT/EP2009/067786 filed Dec. 22, 2009, which designates the United States and the content of which is incorporated herein by reference.

FIELD OF THE INVENTION

The present invention is concerned with a sensor arranged with a wireless transceiver. In particular it is concerned with a wireless sensor for monitoring vibration of a machine. The invention may advantageously be used for condition monitoring of machines in an environment in which combustible or explosive gases can occur.

BACKGROUND OF THE INVENTION

In an industrial installation a distributed control system (DCS) or an industrial control system may be equipped with a large number of field devices, including sensors and instruments. Usually such an industrial installation has one or more control rooms and a computer system which are connected by one or more data networks, such as buses or fieldbuses to the various field devices. The data network may comprise both wired and wireless links. Field devices may include various types of sensor instrument such as vibration sensors, pressure sensors, temperature gauges, as well as devices that include an actuator such as a valve actuator, a solenoid, a breaker or isolator or on/off switch and the like. Each field device such as a wireless sensor needs to be configured suitably to carry out the chosen function of monitoring an individual device. Each wireless sensor and field device at a specific location are usually given an identity in the control system or DCS. A wireless sensor may also have an identity in a wireless network.

Typically Wireless Sensor Networks (WSN) have been used to collect a couple of bytes (e.g. a temperature value) from each node. Vibration is, however, a more demanding phenomenon to monitor with wireless communication because of the large amount of data (e.g. 4 or 8 kB of data) that is needed for the vibration analysis. An important technical requirement for a wireless sensor is that of power use. For sensors which are not supplied from the grid or another power supply, but supplied instead by an independent power source such as a battery or a fuel cell, the power characteristics of the power source and useful lifetime between replacement are critical factors. The power use must be sufficiently low so that a battery will last for a period of 1 or more years between replacement.

U.S. Pat. No. 7,424,403 entitled Low power vibration sensor and wireless transmitter system sensor and wireless transmitter system, assigned to CSI Technology Inc., describes a sensor system that senses parameters of a machine including vibration and produces dynamic signals representing the sensed parameters. The system converts the signals to a digital format, digitally filters and processes the signals. A processor 20, preferably a digital signal processor DSP, determines a plurality of levels relative a predetermined set of data points of the digital signal. The processor determines a peak level value and calculates a true root-mean-square. The peak level and the RMS value are communicated wirelessly by a communication module of the system to a control protocol network. A system power supply powers both the processor and a communication module. The power supply from the battery to the measurement system, not including the communication module, is controlled by the processor 20. However, a disadvantage of this approach is that analysing measurements in the processor of the sensor before wirelessly transmitting such processed data requires additional memory storage, some delays, more processing power and uses more electrical power from the battery. This is often the case when a manual request for a data sample is made by an operator who waits for the processed result.

In an environment such as an installation for extraction, production or processing of oil, petrochemicals and/or gas it is vital that the equipment complies with standards to avoid explosions or fires should explosive vapours be present. For example a European ATEX standard (Appareils destinés à être utilisés en ATmosphères EXplosibles) compatible with equipment directive 94/9/EC regulates aspects such as avoiding that an equipment can become a source of ignition. Thus all equipment is required to be fully enclosed so that gases and etc do not normally enter the equipment. The ATEX requirement also involves avoiding that components can become sufficiently hot to ignite explosive gas or vapour, both during normal operation and in a possible failure mode. For example, if a battery should fail with an internal short circuit, that failure should not be allowed to lead to an ignition source. Thus there is a technically challenging simultaneous requirement for stand alone wireless sensors with an energy source with sufficient energy density to power a sensor for a long period of time versus the requirement to avoid that any component can become hot or overheated during use or failure.

SUMMARY OF THE INVENTION

The aim of the present invention is to remedy one or more of the above mentioned problems. This and other aims are obtained by a device characterised by the claims.

According to a first aspect of the invention, a wireless sensor is described for connection to a wireless network for communication of a sensed physical parameter, said wireless sensor comprising at least one vibration sensor, a processor, a wireless radio transmitter, an independent and self-contained power source and a base part for mounting said wireless sensor on an equipment or structure, wherein the wireless sensor further comprises an electrical power storage device arranged for storing electrical power supplied at a limited power level by said independent and self-contained power source and for supplying electrical power to said wireless radio transmitter at a power level which exceeds the limited power level.

According to an embodiment of the invention a wireless sensor is disclosed for connection to a wireless network for communication of a sensed physical parameter, said wireless sensor comprising at least one vibration sensor, a processor, a wireless radio transmitter, an independent and self-contained power source and a base part for mounting said wireless sensor on an equipment or structure, which further comprises an analogue signal conditioner processor and at least one other processor. In another embodiment the wireless sensor comprises an analogue signal conditioner processor and at least two other processors.

According to another embodiment of the invention a wireless sensor is disclosed for connection to a wireless network for communication of a sensed physical parameter, said wireless sensor comprising at least one vibration sensor, a processor, a wireless radio transmitter, an independent and self-contained power source and a base part for mounting said wireless sensor on an equipment or structure, wherein said wireless radio transmitter is configured for wireless communication with other sensors or devices in a wireless network configured as a mesh network.

According to an embodiment of the invention a wireless sensor is disclosed for connection to a wireless network for communication of a sensed physical parameter, said wireless sensor comprising at least one vibration sensor, a processor, a wireless radio transmitter, an independent and self-contained power source and a base part for mounting said wireless sensor on an equipment or structure, wherein said wireless radio transmitter is continuously powered and configured to listen for wireless communication requests from other sensors or devices in a wireless network.

According to another embodiment of the invention a wireless sensor is disclosed for connection to a wireless network for communication of a sensed physical parameter, said wireless sensor comprising at least one vibration sensor, a processor, a wireless radio transmitter, an independent and self-contained power source and a base part for mounting said wireless sensor on an equipment or structure, wherein said wireless sensor further comprises an electrical power storage device arranged for storing electrical power supplied at a limited power level by said independent and self-contained power source which electrical power storage device of said wireless sensor comprises one or more capacitors.

According to another embodiment of the invention a wireless sensor is disclosed for connection to a wireless network for communication of a sensed physical parameter, said wireless sensor comprising at least one vibration sensor, a processor, a wireless radio transmitter, an independent and self-contained power source and a base part for mounting said wireless sensor on an equipment or structure, wherein the base part is made of metal and is further arranged with fastening means for fixing the wireless sensor to a machine or other structure. This metal base provides a firm attachment and a high thermal capacity or a heat sink in case of component overheating due to a failure. In another embodiment, the base part made of metal is further arranged with a plurality of load bearing surfaces for applying a torque to the base part and fastening said wireless sensor to a machine or other structure with a predetermined torque load. This assures good conduction of vibration to the sensor.

According to an embodiment of the invention a wireless sensor is disclosed for connection to a wireless network for communication of a sensed physical parameter, said wireless sensor comprising at least one vibration sensor, a processor, a wireless radio transmitter, an independent and self-contained power source and a base part for mounting said wireless sensor on an equipment or structure, wherein said wireless sensor further comprises a top cover which completely covers the components inside and adjacent metal base part, said top cover also comprising a switch and a LED indicator and enclosing the wireless radio transmitter and the lower parts such that there is no communication port or terminal on the exterior of said wireless sensor.

According to another embodiment of the invention a wireless sensor is which comprises a top cover made of a material transparent to radio waves, which top cover completely covers the components inside and adjacent metal base part and is constructed to withstand a load of at least 100 kg.

The wireless sensor contains two or more separate low-power processors, preferably three processors. The wireless radio transceiver contains a dedicated communication processor, a flash memory as well as a radio transceiver. Two other low power processors or controllers are used to give high resolution, low noise analogue sampling.

The wireless vibration sensor operates during a short period when it uses battery power, followed by long periods, days or weeks, with no consumption. Long life batteries such as lithium-based batteries have a ramp-up period, a delay on being switched on, before the battery can start to deliver power. This difficulty is solved according to the invention by using a power storage or power conditioning device such as a capacitor to compensate for the delayed supply of power from the lithium battery. The available voltage from the battery is also limited by safety resistors to comply with ATEX requirements, and the voltage available is not sufficient to power the wireless transceiver. Again, the power storage device or capacitor compensates for the limited voltage and provides enough power to operate the wireless transceiver.

The low power consumption results in long battery life. The low power and restricted voltage provides an autonomous wireless vibration sensor that complies with requirements such as ATEX and is suitable for use in environments where a potentially explosive gas or vapour can occur.

According to another aspect of the invention, a method is disclosed for sensing physical parameters of an equipment or a structure by means of a wireless sensor for connection to a wireless network for communication of sensed physical parameter data, said wireless sensor comprising at least one vibration sensor, a processor, a wireless radio transmitter, an independent and self-contained power source and a base part for mounting said field device on an equipment or a structure, wherein physical parameter data is sensed and data dependent on the sensed parameters transmitted by the wireless sensor during an active cycle, the method further comprising receiving in the wireless transceiver a request for data from another wireless node controlled by a master station powering the wireless transceiver from an electrical power storage device arranged for storing electrical power supplied at a limited power level by said independent and self-contained power source at a power level which exceeds the limited power level for a limited time, processing the signals in two or more processors and transmitting by means of the wireless transceiver the raw physical parameter data to a wireless radio network.

In another aspect of the invention a control system is disclosed which is arranged with a wireless network for communication of process data or control information, and at least one wireless sensor, said at least one wireless sensor comprising at least one vibration sensor, a processor, a wireless radio transmitter, an independent and self-contained power source and a base part for mounting said wireless sensor on an equipment or a structure, wherein the wireless sensor further comprises an electrical power storage device arranged for storing electrical power supplied at a limited power level by said independent and self-contained power source and supplying electrical power to said wireless radio transmitter at a power level which exceeds the limited power level during an active cycle.

BRIEF DESCRIPTION OF THE DRAWINGS

A more complete understanding of the method and system of the present invention may be had by reference to the following detailed description when taken in conjunction with the accompanying drawings wherein:

FIGS. 1a-1d show schematic block diagrams of a wireless sensor according to a first aspect of the invention where FIG. 1a shows an exterior view of the complete wireless sensor, FIG. 1b shows a view from above, FIG. 1c shows a side view of a cross section showing components of the wireless sensor and FIG. 1d a view of another side of the same components of the wireless sensor;

DETAILED DESCRIPTION OF THE INVENTION

Figure 2:
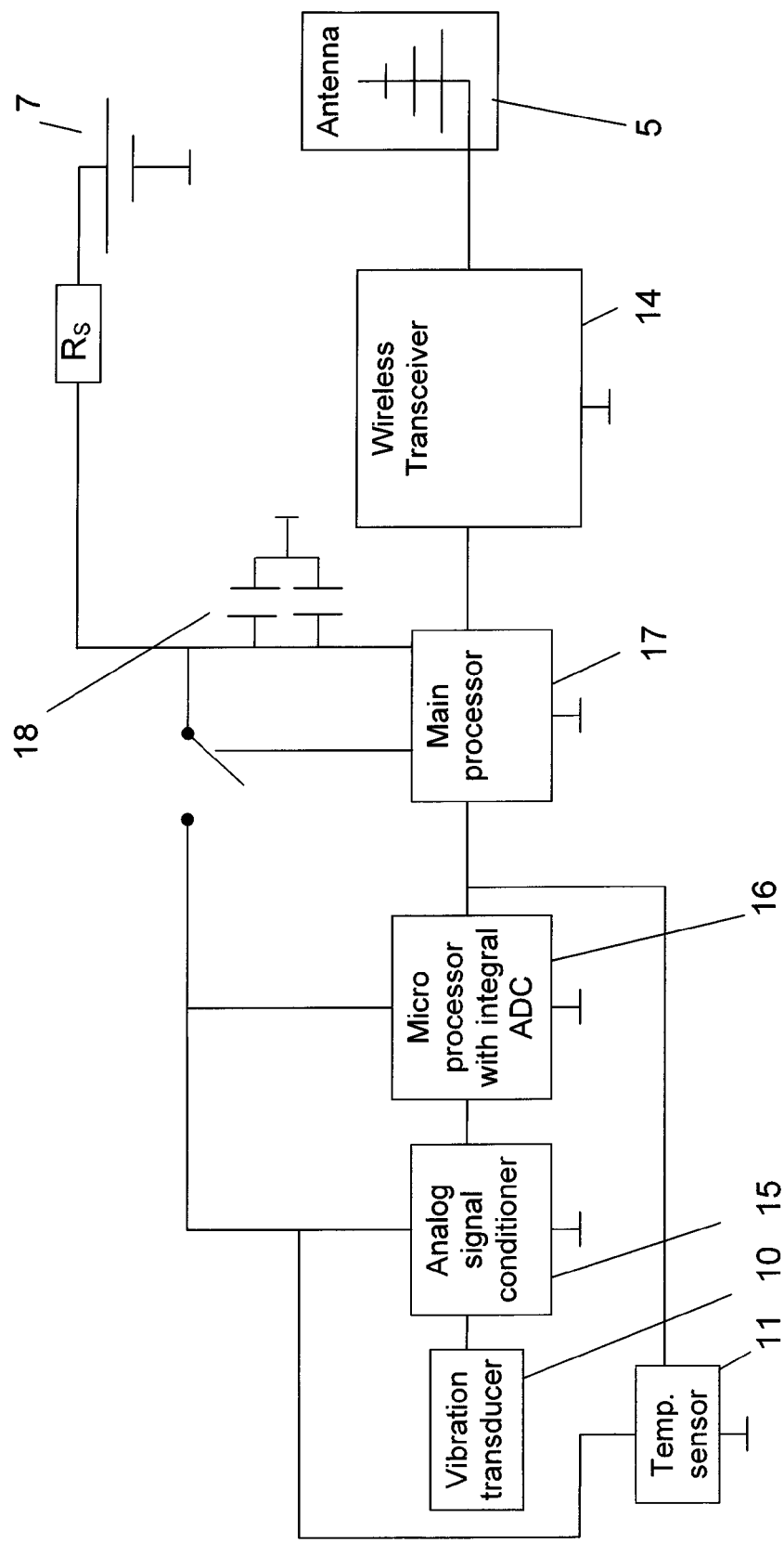
FIG. 2 shows a schematic layout for the wireless sensor invention of FIG. 1 and in particular a schematic for a circuit layout according to an embodiment of the invention.

FIG. 2 shows a schematic block diagram of the wireless vibration sensor. The figure shows a vibration transducer or sensor 10, and analogue signal conditioner 15, and two other processors arranged as a microprocessor with integral A-D conversion 16, a main processor 17. The figure also shows a wireless transceiver 14, and antennae 5 and a battery 7 or other independent power source. A resistor $R_S$ is arranged in series between the battery 7 and the other components on pcb 19. The resistor is preferably of the thin film resistor type which is preferred for safety reasons because that type of resistor does not have short circuit as a failure mode. This safety resistor (or resistors) $R_S$ limits the maximum voltage that can be drawn from the battery by the components on the pcb to comply with the ATEX requirements.

The vibration sensor 10 is preferably an accelerometer. A suitable vibration sensor/transducer or accelerometer is of the MEMS-based piezo-resistive bridge transducer. It picks up the vibration from eg the ball bearings in a machine as a charge proportional to the derivative of the acceleration. This charge is picked up and shaped by the analogue signal conditioner 15 to produce analog signals proportional with the vibration velocity (band 10 Hz to 1 kHz) and vibration envelope (500 Hz to 10 kHz).

A microcontroller 16 with an integral sigma delta ADC converter samples the velocity and envelope signals with approx. 2 kHz sample rate in two 1 s data streams delivered to the main processor over an I2C bus. This operation is done at full power and speed. When the sampling and data delivery is completed, the power to the analogue conditioner and the microcontroller 16 with integral ADC is switched off. The tasks of the individual processors are specialized. They do not have to hold memory or run other general tasks. They do not need to be active other than to carry out their specific tasks which are limited to very short periods of time. Thus the power consumption has been optimised to a minimum for these functions. Another advantage of the specialised processors is that a low power mode of operation is not necessary for the either the analogue conditioner processor or the ADC processor as power is completely switched off when vibration sensing is not active. Similarly, the temperature data from temperature sensor 11 is delivered over a robust serial data bus, preferably a multi master serial computer bus such as an I2C bus.

The main processor 17 is preferably a micro controller without a Digital Signal Processor (DSP) such as a microcontroller available for example from Texas Instruments and arranged to receive Hart commands. The HART commands are preferably transmitted using an encrypted or otherwise secure transport layer such as a TTL level (tunnel transport layer). The HART type commands are transmitted from the wireless radio transceiver 14 to the main processor which executes functions accordingly. Preferably the wireless radio transceiver 14 is a type of Dust Wireless Hart mote, supplied by Dust Networks Inc. Responses are preferably delivered as defined in the Wireless Hart standard, including raw sampled data streams for vibration velocity and envelope, velocity RMS value, envelope peak to peak value and temperature. The temperature value represents temperature sensed by a sensor 11 arranged in the base part 1 of the wireless sensor, and the measurement is primarily dependent on temperature of the machine or structure that the wireless sensor is fixed to. It is not arranged to register ambient temperature.

To save power, the main processor enters a low power mode when there are no commands to execute. As part of the low power solution, there is only one low frequency crystal clock oscillator. All operation modes are derived from this oscillator. The clock wakes up the MCU typically once a day (the interval may be configured wirelessly) to sample vibration data. To save power no data-processing is executed in the processors of the wireless sensor to derive bearing status or other vibration status information. No historical data is stored in the wireless sensor and data storage, data processing and data analysis are all carried out in one of more computers (see description in relation to FIGS. 3, 4 below).

During the 'sleep' part of the cycle, the current consumption is close to zero. The wireless radio transmitter 14 is however continuously powered and configured to listen for requests by wireless communication from other sensors, the gateway 26 or other master station, or other devices in a mesh network 20. The power consumption by the radio while "listening" is extremely low. In all other respects, the sensor cycles consist of short periods of power and demand, when the sensor is 'woken up', and long periods with almost no power consumption at all. Batteries such as lithium based batteries have a period, a delay or ramp up, before the lithium battery can start to deliver the rated current, due to varying rates of chemical reaction in a start up period. This problem is solved by the use of a power conditioning device in the form of a power storage device.

The capacitor bank 18 provides additional charge during the period when the lithium battery is not supplying enough current. Thus sufficient power to power the circuit are provided initially at least by the capacitors and not directly from the battery. Capacitor size is chosen within the max limits defined by the ATEX standard for zone 0/1 (EN60079-11) for the max voltage of a single cell Lithium battery (3.9V). Resistor $R_S$ between battery (7) and capacitor bank (18) limits power dissipation upon a failure (short circuit) in an electronic component, limiting max temperature rise within the maximum limit allowed by the standard.

The only communication interface of the WiMon100 wireless sensor sensor is over the Wireless Hart radio. The sensor is arranged as completely enclosed as to meet the requirements of ATEX it is forbidden for the user to open the sensor. The WiMon100 wireless sensor does not require a communication port or terminal as well as the wireless radio communication and therefore there is no communication port or terminal included in the wireless sensor.

FIG. 1a shows an exterior view of the complete wireless sensor. The figure shows a wireless sensor 9, comprising an upper part or cover 3, a lower part 2 and a base part 1. The upper part or cover 3 is arranged with an indicator light 4 in the form of an LED (Light emitting diode) and an on-off push button 8. The upper part is made of a plastic or composite material and suitably compounded so that it is non-static and also so that it is transparent to radio signals. At the same time the wireless sensor has to be a robust device to comply with ATEX requirements. Thus the top cover 3, made from a RF transparent plastic material, is capable of bearing a load of 100 kg in line with the robustness requirement. To simplify assembly, the top cover 3 is arranged to be screwed onto the base making the sensor resistant to water jetting according to a standard such as IP66. The cover comprises an integrated push button 8 and a LED light 4. The cover is shaped and dimensioned so that the cover diameter is less than the dimensions of a suitable tool for screwing the wireless sensor into places from above, by placing a wrench or socket or tube spanner or other tool over the complete sensor to grip the metal base 1.

The base part 1 of the sensor is shaped with load-bearing faces 33, 34, 35 arranged on the base, suitable for gripping the sensor. In the bottom part of the wireless sensor there is a blind hole 21 or cavity arranged with a screw thread to fasten the sensor to a threaded stud or bolt (not shown). In FIG. 1*b* the base part 1 is shown as a simple hexagon shape, showing in principle a hexagonal nut with load bearing faces 33, 34, 35 which may be used to grip and tighten the sensor with a wrench, spanner or power tool and fasten it to a stud, bolt or other suitably threaded part firmly fixed to a machine to be monitored. The exterior of the base part 1 is preferably shaped with 6 flat faces and the corners of the hexagon, or other regular or custom polygon shape, are rounded off (not shown).

FIG. 1*c* shows a view from one side of some inner components of the wireless sensor. FIG. 1*d* shows a view from another side of the same inner components of the wireless sensor. The figure shows a substrate or pcb board 19 (printed circuit board) with components such as capacitors 18, microprocessor with integral A-D conversion 16 and main processor 17 mounted on it. The wireless transceiver 14 and an antenna 5 are also mounted on the pcb board. The figure shows a battery 7 and a position of the vibration sensor 10 and of the analogue signal conditioner 15 located fixed inside the metal base part 21. The battery is clamped to the main pcb board 19 and, in turn, to the metal base 2 with a clamp 13 and is mounted on top of a second and smaller pcb board 12 which is electrically joined to the main pcb board 19 by a flexible strip conductor 6.

A first advantage of the flexible connection 6 between the two PCBs is that it enables a more compact format as the space in the housing, the metal base part 1, is better utilized. Another advantage is that it allows the pcb 12 with the vibration transducer/sensor 10, to be placed horizontally against the metal base part and to be secured firmly to the metal base thus optimizing vibration pick-up. The advantages of the arrangement of two pcbs 12, 19 connected by a flexible connector 6 are clear. This feature has technical advantage compared with conventional a connection between pcbs 12 and 19 using a cable and plugs. The flexible connector is more robust and less liable to loss of conductivity. In contrast, plugs would be weak links vulnerable to vibration (mechanical failure) and corrosion (deterioration of conductivity). Preferably the flexible connector or flex circuit is of the Flexprint type a circuit mounted on a flexible plastic substrate comprising a polyimide, PEEK (Polyether ether ketone) or polyester film.

The metal base part has a substantial thermal capacity and acts as a heat sink to disperse any heat developed by the battery 7 during operations. The thermal capacity of the base and the way the battery is firmly secured to it ensures that the base acts as a heat sink to such a degree that the surface temperatures of the sensor will never cross the specified threshold for ATEX certification. The material of the base is preferably stainless steel. The vibration sensor 10 is mounted firmly attached to pcb 12 inside the base part to provide superior conduction of mechanical vibration from the base part 1 to the sensor 10.

The wireless transceiver is preferably a Dust Wireless Hart Mote (DN2510). The DN2510 Mote connects to a Dust Networks proprietary meshed radio network and uses this network to communicate according to the Wireless Hart standard. It controls a radio transceiver, modulates and demodulates Hart messages between the vibration storage and data processing functions 40 in computer/s 29, 30 and the main processor 17. In addition it continuously keeps the meshed radio network operational and healthy, independent of any Hart activity. The data is primarily collected acting on a request for data received as requests by wireless communication from other sensors, the gateway 26 or other master station, or other devices in the wireless network 20. The requests may originate from an operator request. Alternatively or as well, the wireless sensor can collect data dependent on a configuration to sense and send physical parameters according to a predetermined transmission schedule.

The two microcontrollers 16, 17 are low power microprocessors, with high resolution and low noise. Suitable microprocessors may be obtained from Texas Instruments, with a sigma delta high resolution which is provided such small chips delivering less noise and more accuracy, as well as low power consumption.

The wireless sensor has one pushbutton 8 and one LED 4 forming an operator interface, which is used for commissioning only. The unit is switched on by a short push on the button. The LED responds with blinks of light with increasing frequency for a few seconds. The unit is switched off by a long push on the button 8. After 4 seconds, deactivation is started. When deactivation is completed the LED may be arranged to flash or blink for a few seconds with blinks with decreasing frequency.

Figure 3:
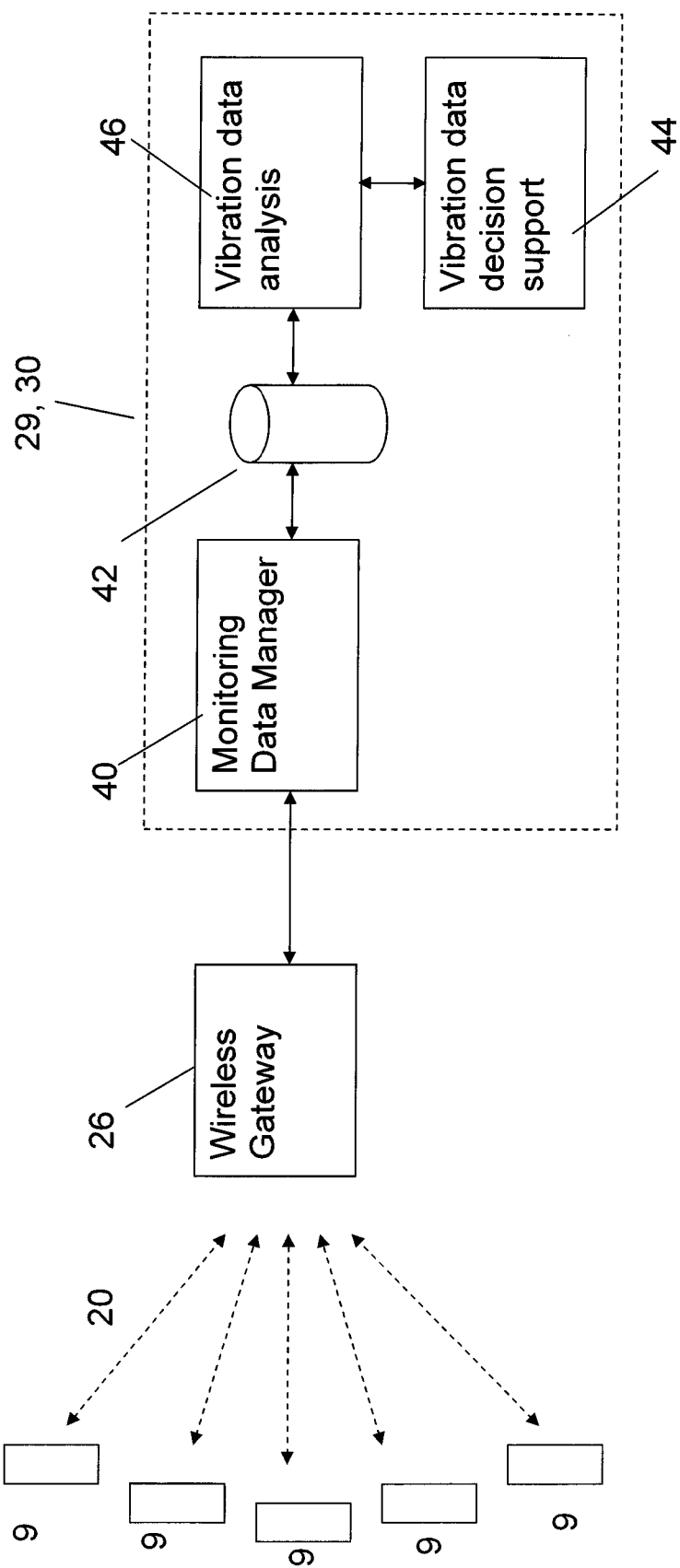
FIG. 3 shows the wireless sensor invention of FIG. 1 and in particular a diagram showing a plurality of sensors and communication of the wirelessly transmitted data to an industrial control system for data storage and analysis, according to another embodiment of the invention.

FIG. 3 shows a plurality of sensors arranged for wireless communication of the sensed data to an industrial control system for data storage and analysis. The figure shows a number of wireless sensors 9, a wireless mesh network 20, and a wireless gateway 26 or router. The figure also shows one or more workstations or computers 29, 30. The wireless gateway may communicate with the computers by means of an Ethernet TCP/IP connection. The computers are connected with a database 42 for storing the sensed physical parameters, this being primarily vibration data and the temperature data. The computers or workstations are also are arranged to run a computer application 40 which manages the data from the wireless sensor monitoring, an application 46 for analysis of the vibration data sensed by the wireless vibration sensors, and an application 44 which provides decision support for operators or other users based on the vibration data and the analysis. The data analyses are also stored in database 42 as well as the raw sensed parameter data so that frequency spectrum analyses of real time, time series and historic data may be supported, allowing supervision of vibration footprint over time.

Figure 4:
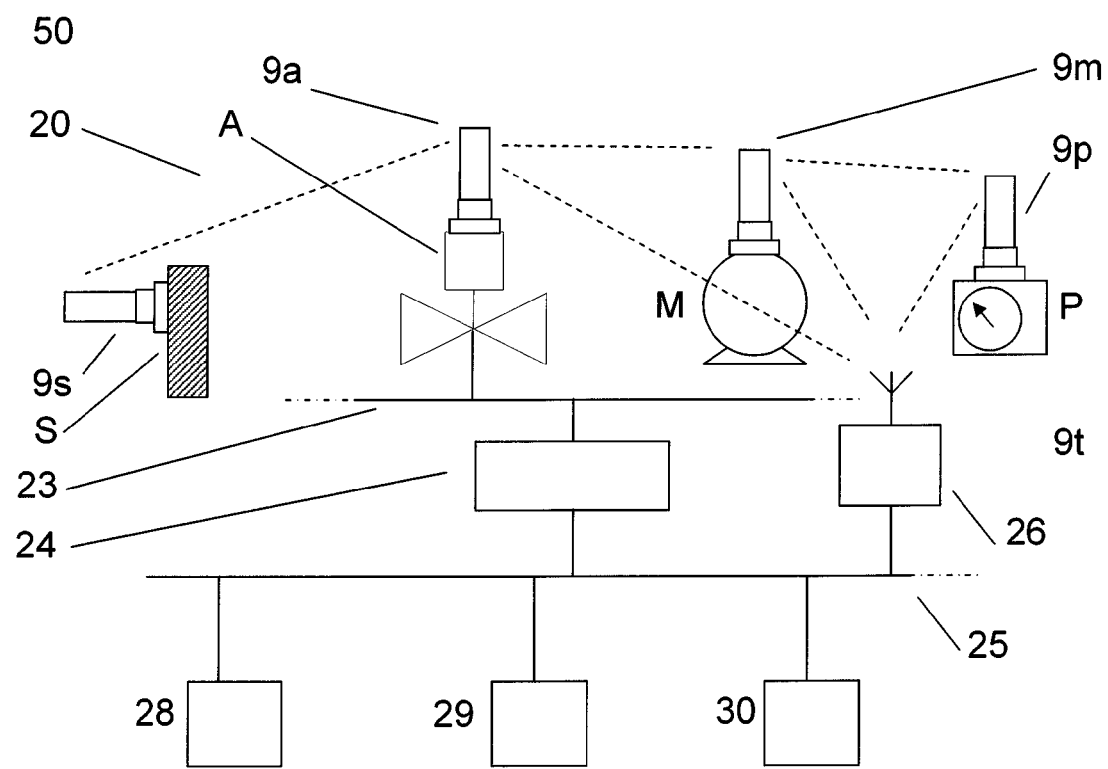
FIG. 4 shows a schematic diagram for the wireless sensor invention of FIG. 1 arranged for use in an industrial control system according to an embodiment of the invention.

FIG. 4 shows a control system with a wireless data mesh network 20 to which a plurality of wireless sensors 9*a*, 9*m*, 9s, 9t are connected. The figure also shows a distributed control system 50 with the wireless data network 20, a wired fieldbus 23 and a wireless router or gateway 26. The DCS may have one or more wired data networks 25 to which may be connected an industrial controller 24, a central control system computer 28, an operator workstation 29 and an engineering workstation 30. Equipment and monitoring and/or control equipment such as the valve A may be connected, eg by a fieldbus 23 directly to a control system computer 28 or connected via an industrial controller 24 to a control system or DCS.

FIG. 4 also shows a first wireless sensor 9s arranged mounted on a structure such as a stand, a wall or framework in a petrochemical plant or similar process installation. A second wireless sensor 9a is arranged fixed to an actuator or valve. A third wireless sensor 9m is arranged mounted on an electric motor M. A fourth wireless sensor 9p is shown arranged together with a pressure measuring instrument P. Wireless communication from the wireless sensors 9 to the control system DCS may be carried out by the wireless sensors communicating directly with the hub or gateway 26, or by sending transmissions via other wireless sensors such as may be done mesh networks or with certain wireless sensor networks WSN.

Depending on the communication protocol used and the configuration of the wireless mesh network 20 a wireless sensor may communicate directly with the DCS or other type of industrial control. Communication may be configured according to a predetermined time schedule. Communication may also be configured according a HART or WHART standard, and requests for data communicated wirelessly to the wireless sensor by other nodes in a daisy chain or other wireless network. The wireless sensor has stored in a non-volatile data storage memory of one of the processors (117 or 17) data identifying the wireless node, for example a MAC address (Media Access Control address) identifying it to the in the wireless network and optionally identifying it as a unique name or tag name in the control system 50.

In a preferred embodiment of the invention a wireless sensor in the form of a vibration sensor (9m) is provided. This is a small, autonomous sensor unit is mounted on a motor 9m, for example an AC motor powering a pump, fan or an actuator. The unit comprises a vibration transducer element (preferably an accelerometer), analogue filtering, A/D conversion, and wireless radio communication to a computer. The raw vibration data is communicated wirelessly via a hub or gateway 26 to a computer for data handling, analysis and data storage. The computer may be connected in a control system 50, a process control system or an automation system. The control system computer performs the necessary data analysis and makes the data available to potential users.

The preferred independent power supply is a lithium-thionyl chloride battery. Other types of lithium based batteries may be used instead. A chemical based battery based on other elements or compounds may optionally be used. Other independent power sources such as miniature fuel cells may be used instead to generate electrical power in the autonomous wireless sensor or instrument.

The nature of the mounting or fastening of the wireless sensor on mounted an equipment or a structure may be critical to the measurement and/or other function of the field device. A vibration sensor mounted on a pump or motor requires a permanent type of attachment to the motor or structure. The vibration sensor may be mounted and fixed in place with a screw thread fastener, and tightened up to a predetermined torque value. This preloaded mounting provides better conduction of vibration from the pump or motor frame or enclosure into the sensor base.

The wireless sensor 9 may be arranged a node of a wireless LAN, and/or may be another kind of wireless node, running any radio protocol suitable for an industrial milieu, compatible with as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, a WirelessHART standard, or similar.

It should be noted that while the above describes exemplifying embodiments of the invention, there are several variations and modifications of the wireless sensor, and in particular to the power consuming components described, which may be made to the disclosed solution without departing from the scope of the present invention as defined in the appended claims.

What is claimed is:

1. A wireless sensor for connection to a wireless network for communication of a sensed physical parameter, said wireless sensor comprising:
   at least one vibration sensor measuring vibrations of an equipment or structure in an industrial installation, a processor processing vibration data from the vibration sensor, and a wireless radio transmitter transmitting said vibration data to an industrial control system,
   an independent and self-contained power source powering said processor, said processor being set in a low power mode in the absence of a measurement request being received by the wireless radio transmitter,
   an electrical power storage device powering said wireless radio transmitter,
   an enclosure fully enclosing said vibration sensor, said processor, said wireless radio transmitter, said power source and said electrical power storage device, said enclosure inhibiting entry of gases from outside into said enclosure, and
   a base part for mounting said enclosure on the equipment or the structure in the industrial installation,
   wherein said base part is made of metal, acting as a heat sink by dissipating heat from said power source,
   wherein said power source is fixed inside the base part of said wireless sensor, and
   wherein the electrical power storage device is configured to store electrical power which is supplied by said power source having a limited power level and supply the electrical power to said wireless radio transmitter at a power level which exceeds the limited power level of said power source for a limited time.

2. The wireless sensor according to claim 1, wherein said wireless sensor comprises an analogue signal conditioner for processing an analogue signal from the vibration sensor.

3. The wireless sensor according to claim 1, wherein said wireless sensor comprises an analogue signal conditioner processor and at least one other processor, said at least one other processor includes said processor.

4. The wireless sensor according to claim 1, wherein said wireless sensor comprises an analogue signal conditioner processor and at least two other processors, said at least two other processors include said processor.

5. The wireless sensor according to claim 1, wherein said processor includes a microprocessor arranged for analogue to digital conversion of an analogue signal originating from the vibration sensor.

6. The wireless sensor according to claim 1, wherein said processor includes a processor arranged for processing digitally processed signals originating from the vibration sensor.

7. The wireless sensor according to claim 1, wherein said wireless radio transmitter is configured for wireless communication with other sensors or devices in the wireless network configured as a mesh network.

8. The wireless sensor according to claim 1, wherein said wireless radio transmitter is continuously powered and configured to listen for wireless communication requests from other sensors or devices in the wireless network.

9. The wireless sensor according to claim 1, wherein said wireless sensor comprises a temperature sensor measuring a temperature of the equipment or structure, said temperature measurements made by the temperature sensor are communicated by said wireless radio transmitter to the wireless network.

10. The wireless sensor according to claim 1, wherein the power source of said wireless sensor is a lithium-based battery.

11. The wireless sensor according to claim 1, wherein the electrical power storage device of said wireless sensor comprises one or more capacitors.

12. The wireless sensor according to claim 1, wherein
said enclosure comprises a top cover which completely covers the components inside said enclosure, said top cover is adjacent to said metal base part,
said top cover also comprising a switch and a LED indicator and enclosing lower parts of said wireless sensor such that there is no opening to an exterior of said wireless sensor.

13. The wireless sensor according to claim 1, wherein
said enclosure comprises a top cover which completely covers the components inside said enclosure, said top cover is adjacent to said metal base part,
said top cover also comprising a switch and a LED indicator and enclosing the wireless radio transmitter and lower parts of said wireless sensor such that there is no communication port or terminal on an exterior of said wireless sensor.

14. The wireless sensor according to claim 1, wherein
said enclosure comprises a top cover made of a material transparent to radio waves, said top cover completely covers the components inside and adjacent said metal base part and is constructed to withstand a load of at least 100 kg.

15. The wireless sensor according to claim 1, wherein
the base part made of metal is further arranged with fastening means for fixing the wireless sensor to the equipment or the structure.

16. The wireless sensor according to claim 1, wherein
the base part made of metal is further arranged with a plurality of load bearing surfaces for applying a torque to the base part and fastening said wireless sensor to the equipment or the structure with a predetermined torque load.

17. The wireless sensor according to claim 1, wherein
setup data stored in a a memory storage device of said processor of said wireless sensor comprises information to identify said wireless sensor as a node of the wireless network and/or a unique device name in the control system.

18. The wireless sensor according to claim 1, further comprising a safety resistor which limits a voltage drawn by the processor from the power source based on requirements set forth in standards.

19. The wireless sensor according to claim 18, wherein the safety resistor limits power dissipation when there is an electrical failure.

20. The wireless sensor according to claim 1, further comprising a power conditioning device to provide additional charge during periods when the power source is not supplying enough current to the processor.

21. The wireless sensor according to claim 20, wherein sufficient power to power the processor is provided initially by the electrical power storage device and not directly from the power source.

22. The method for sensing a physical parameter of an equipment or a structure in an industrial installation, the method comprising the steps of:
using a wireless sensor connected to a wireless network for communication of the sensed physical parameter, said wireless sensor having
at least one vibration sensor measuring vibrations of the equipment or the structure in the industrial installation, a processor processing vibration data from the vibration sensor, and, a wireless transceiver transmitting said vibration data to an industrial control system,
an independent and self-contained power source powering said processor, said processor being set in a low power mode in the absence of a measurement request being received by the wireless transceiver,
an electrical power storage device powering said wireless transceiver,
an enclosure fully enclosing said vibration sensor, said processor, said wireless transceiver, said power source and said electrical power storage device, said enclosure inhibiting entry of gases from outside into said enclosure, and
a base part for mounting said enclosure on the equipment or the structure,
wherein physical parameter data is sensed and data dependent on the sensed physical parameter transmitted by the wireless sensor during an active cycle, wherein said base part is made of metal, acting as a heat sink by dissipating heat from said power source, and wherein said power source is fixed inside the base part of said wireless sensor,
receiving in the wireless transceiver said measurement request from another wireless node controlled by a master station,
powering the wireless transceiver with the electrical power storage device, the electrical power storage device being configured to store electrical power which is supplied by said power source having a limited power level and supply the electrical power at a power level which exceeds the limited power level of said power source for a limited time,
processing signals from the vibration sensor in two or more processors and transmitting by means of the wireless transceiver raw physical parameter data to the wireless network, said two or more processors include said processor.

23. The method according to claim 22, further comprising the steps of:
sensing vibration by means of an analogue signal generated in said vibration sensor,
converting the analogue signal to a digital signal in an ADC processor and
sending the digital signal containing unprocessed vibration data by means of the wireless transceiver to the wireless network.

24. The method according to claim 22, further comprising the steps of sending a wireless signal to the wireless transceiver and configuring wirelessly an interval for parameter sensing or measurement collection by the wireless sensor.

25. The method according to claim 22, further comprising the step of receiving in the wireless transceiver a request to sense said physical parameter and send said physical parameter to the network via the wireless transmitter from another wireless node controlled by a gateway or master station configured according to a HART or a wireless HART protocol.

26. The method according to claim 22, further comprising the step of receiving in the wireless transceiver a request to sense and send said physical parameter dependent on a predetermined transmission schedule.

27. Use of a wireless sensor in a distributed industrial control system arranged with a wireless network for measurement and communication of vibration data and/or temperature information, said wireless sensor comprising, a vibration sensor measuring vibrations of an equipment or structure in an industrial installation, a wireless radio transmitter transmitting the vibration data to the industrial control system, an independent and self-contained power source powering a processor, said processor being set in a low power mode in the absence of a measurement request being received by the wireless radio transmitter, an electrical power storage device powering said wireless radio transmitter, an enclosure fully enclosing said vibration sensor, said processor, said wireless radio transmitter, said power source and said electrical power storage device, said enclosure inhibiting entry of gases from outside into said enclosure, and a first base part for mounting said enclosure on the equipment or the structure in the industrial installation,
  wherein said base part is made of metal, acting as a heat sink by dissipating heat from said power source,
  wherein said power source is fixed inside the base part of said wireless sensor, and
  wherein said electrical power storage device is configured to store electrical power which is supplied by said power source having a limited power level and supply the electrical power to said wireless radio transmitter at a power level which exceeds the limited power level of said power source for a limited time.

28. A distributed industrial control system arranged with a wireless network for communication of process data or control information, and at least one wireless sensor, said wireless sensor comprising at least one vibration sensor measuring vibrations of an equipment or structure in an industrial installation, a processor processing vibration data from the vibration sensor, a wireless radio transmitter transmitting said vibration data to an industrial control system, an independent and self-contained power source powering said processor, said processor being set in a low power mode in the absence of a measurement request being received by the wireless radio transmitter, an electrical power storage device powering said wireless radio transmitter, an enclosure fully enclosing said vibration sensor, said processor, said wireless radio transmitter, said power source and said electrical power storage device, said enclosure inhibiting entry of gases from outside into said enclosure, and a base part for mounting said enclosure on the equipment or the structure,
  wherein said base part is made of metal, acting as a heat sink by dissipating heat from said power source,
  wherein said power source is fixed inside the base part of said wireless sensor, and
  wherein the electrical power storage device configured to store electrical power which is supplied by said power source having a limited power level and supply the electrical power to said wireless radio transmitter at a power level which exceeds the limited power level of said power source for a limited time during an active cycle.

29. The system according to claim 28, wherein the wireless network is arranged compatible with a HART or wireless HART standard.

30. The system according to claim 28, wherein the wireless network is configured as a wireless mesh network.

31. The system according to claim 28, wherein the system comprises a database for storing sensed parameters for vibration and/or temperature measurements transferred from said at least one wireless sensor.

32. The system according to claim 28, wherein the system comprises one or more computers and/or workstations configured for use with a computer application for data analysis of sensed parameters for vibration and/or temperature.

33. The system according to claim 28, wherein the system comprises one or more computers and/or workstations configured for use with a computer application for managing sensed parameters for vibration and/or temperature.

34. The system according to claim 28, wherein the system comprises one or more computers and/or workstations configured for use with a computer application for providing decision support to a user or operator based on any from the group of: sensed parameters for vibration and/or temperature in real time; stored sensed parameters; data analysis of the sensed parameters in real time; data analysis of the stored sensed parameters, frequency spectrum analyses of real time, time series and historic data.

* * * * *